United States Patent [19]

Arioka et al.

[11] Patent Number: 4,835,032
[45] Date of Patent: * May 30, 1989

[54] MAGNETIC RECORDING MEDIUM AND RECORDING/REPRODUCING METHOD THEREFOR

[75] Inventors: Hiroyuki Arioka; Masaharu Nishimatsu; Suguru Takayama, all of Tokyo, Japan

[73] Assignee: TDK Corporation, Tokyo, Japan

[*] Notice: The portion of the term of this patent subsequent to Oct. 18, 2005 has been disclaimed.

[21] Appl. No.: 127,550

[22] Filed: Dec. 2, 1987

Related U.S. Application Data

[63] Continuation of Ser. No. 22,536, Mar. 4, 1987, abandoned, which is a continuation of Ser. No. 758,435, Jul. 24, 1985, abandoned.

[30] Foreign Application Priority Data

Jul. 31, 1984 [JP] Japan ............... 59-164357

[51] Int. Cl.$^4$ .............................................. G11B 5/64
[52] U.S. Cl. ................... 428/143; 427/131; 427/132; 428/141; 428/323; 428/694; 428/695; 428/900
[58] Field of Search ............... 428/141, 323, 694, 695, 428/900, 143; 427/128, 132, 131

[56] References Cited

U.S. PATENT DOCUMENTS

| | | | |
|---|---|---|---|
| 4,452,863 | 6/1984 | Takizawa et al. | 428/423.7 |
| 4,486,500 | 12/1984 | Naruo et al. | 427/44 |
| 4,511,635 | 4/1985 | Nagao et al. | 428/694 |
| 4,565,734 | 1/1986 | Arai et al. | 427/132 |
| 4,578,729 | 3/1986 | Suzuki et al. | 427/128 |
| 4,645,703 | 2/1987 | Suzuki et al. | 427/128 |

*Primary Examiner*—Paul J. Thibodeau
*Attorney, Agent, or Firm*—Oblon, Fisher, Spivak, McClelland & Maier

[57] ABSTRACT

A magnetic recording medium comprising a ferromagnetic metal thin film layer primarily based on cobalt and formed on the surface of a flexible substrate, an organic topcoat layer containing a radiation-curable compound, an anti-oxidant, and optionally a lubricant on the surface of the metal thin film layer, and a backcoat layer containing an inorganic pigment, an organic binder, and a lubricant on the other surface of the substrate is provided with protrusions on its surface at an average density of at least $10^5/a^2$ per square millimeter of the surface, the protrusions having a height of 30 to 300 Å, where a is the distance of a gap in a magnetic head with which the medium is used in recording/reproducing operation.

13 Claims, 1 Drawing Sheet

MAGNETIC RECORDING MEDIUM AND RECORDING/REPRODUCING METHOD THEREFOR

This is a continuation of Ser. No. 022,536 filed on Mar. 4, 1987, now abandoned which in turn is a continuation of Ser. No. 758,435 filed July 24, 1985 and now abandoned.

CROSS REFERENCE TO RELATED APPLICATION

Reference is made to our copending application Ser. No. 749, 585, for Magnetic Recording Medium and Recording/Reproducing Method Therefor, filed June 27, 1985, and assigned to the same assignee as the present invention.

BACKGROUND OF THE INVENTION

This invention relates to magnetic recording media, and more particularly, to magnetic recording media of metal thin film type, and a method for conducting recording/reproducing operation in such media.

Among magnetic recording media for use in video, audio and other applications, active research and development works have been made on magnetic recording media, usually magnetic tapes having a magnetic layer in the form of a continuous thin film because of the compactness of a roll of tape.

The preferred magnetic layers for such continuous metal film type media are deposited films of Co, Co—Ni, Co—O, Co—Ni—O and similar systems formed by the so-called oblique incidence evaporation process in which cobalt and optional elements are evaporated in vacuum and directed at a given angle with respect to the normal to the substrate because such evaporated films exhibit superior characteristics. These media should have a flat surface because of remarkable deterioration of their properties due to a spacing loss. However, as the surface become flatter, the friction becomes greater adversely affecting head contact and transport movement.

Usually, the metal thin film type media have a magnetic layer as thin as 0.05 to 0.5 $\mu$m so that the surface property of the media depends on the surface property of the substrate. For example, Japanese Patent Application Kokai No. 53-116115 discloses the provision of gently sloping protrusions in the form of creases or wrinkles on the substrate surface. Also, Japanese Patent Application Kokai Nos. 58-68227 and 58-100221 disclose the location of fine particles on the substrate surface, resulting in surface irregularities observable under an optical microscope with a magnifying power of 50 to 400 and actually measurable for height by means of a probe surface roughness meter. These media are, however, still insufficient in physical properties such as dynamic friction, runnability (the durability of tape which travels in frictional contact with rigid members in a recording machine), and moving stability as well as in electromagnetic properties.

Further, Japanese Patent Publication No. 39-25246 discloses the application of an organic lubricant on the surface of a ferromagnetic metal thin film layer as a topcoat layer for the purpose of reducing dynamic friction. The use of lubricant has the actually undesirable problem that it tends to adhere to the associated head to eventually block the head gap. At present, a technique for improving the surface properties of a metal thin film type magnetic recording medium has not been established which can reduce dynamic friction and eliminate head adhesion accompanied by head gap blocking without interfering smooth movement or adversely affecting electromagnetic properties.

SUMMARY OF THE INVENTION

It is, therefore, an object of the present invention to provide an improved metal thin film type magnetic recording medium which has eliminated head adhesion and head gap blocking without adversely affecting electromagnetic properties while exhibiting satisfactory physical properties including friction, runnability and movement stability.

It is another object of the present invention to provide a method for conducting recording/reproducing operation on such a magnetic recording medium.

A first aspect of the present invention is directed to a magnetic recording medium comprising a flexible substrate having opposed major surfaces, a ferromagnetic metal thin film layer on one surface of the substrate primarily comprising cobalt, an organic topcoat layer on the surface of the metal thin film layer, and a backcoat layer on the other surface of the substrate. The magnetic recording medium is to be used in combination with a magnetic head having a gap. The organic topcoat layer contains a radiation-curable compound, an anti-oxidant, and optionally a lubricant. The backcoat layer contains an inorganic pigment, an organic binder, and a lubricant. The metal thin film layer contains oxygen. The medium has protrusions on its surface at an average density of at least $10^5/a^2$ per square millimeter of the surface, the protrusions having a height of 30 to 300 Å, where a is the distance of the magnetic head gap as expressed in $\mu$m.

The present invention also provides a method for conducting recording/reproducing operation on a magnetic recording medium comprising a flexible substrate having opposed major surfaces, a ferromagnetic metal thin film layer on one surface of the substrate principally comprising cobalt, an organic topcoat layer on the surface of the metal thin film layer, and a backcoat layer on the other surface of the substrate, by passing the medium across a magnetic head having a gap. The organic topcoat layer contains a radiation-curable compound, an anti-oxidant, and optionally a lubricant. The backcoat layer contains an inorganic pigment, an organic binder, and a lubricant. The metal thin film layer contains oxygen. The medium has in average at least $10^5/a^2$ protrusions per square millimeter of the topcoat layer surface, the protrusions having a height of 30 to 300 Å, where a is the distance of the magnetic head gap as expressed in $\mu$m.

BRIEF DESCRIPTION OF THE DRAWINGS

The above and other objects, features, and advantages of the present invention will be more fully understood by reading the following description when taken in conjunction with the accompanying drawings, in which.

It should be noted that the drawings are not drawn to scale and the components are disproportionately depicted for purposes of illustration.

DETAILED DESCRIPTION OF THE INVENTION

Figure 1:
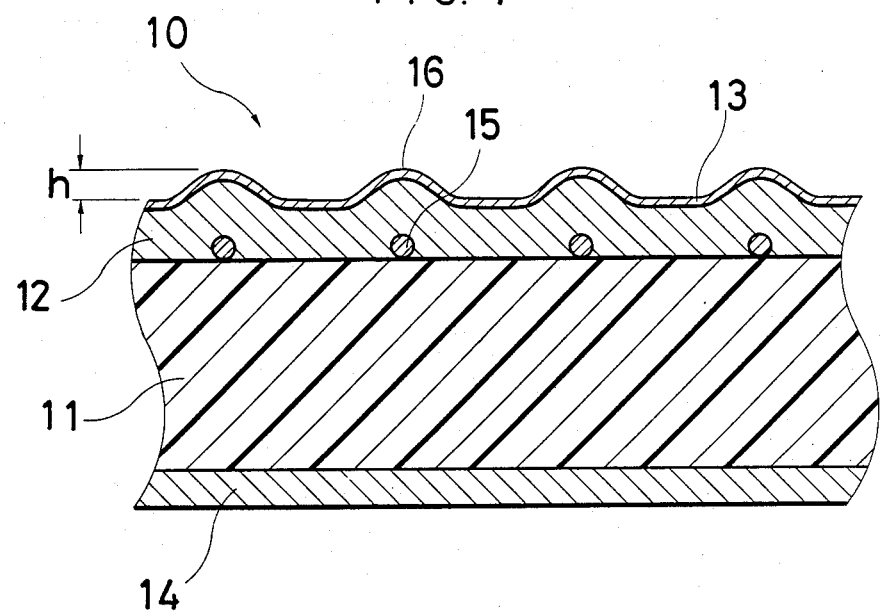
FIG. 1 is a cross-sectional view of a magnetic recording medium according to one embodiment of the present invention.

Referring to FIG. 1, there is illustrated a magnetic recording medium generally designated at 10 according to the present invention. The magnetic recording medium 10 includes a substrate 11 having opposed major surfaces, a ferromagnetic metal thin film layer 12 formed on one major surface of substrate 11, a topcoat layer 13 on the surface of metal thin film layer 12, and a backcoat layer 14 formed on the other major surface of substrate 11. The medium 10 has randomly distributed protrusions or bosses 16 on the surface, preferably on the topcoat surface. These elements will be described in more detail hereinafter.

Substrate

The substrates on which the ferromagnetic metal thin film layer is formed are not particularly limited as long as they are non-magnetic. Particularly preferred are flexible substrates, especially, of resins, for example, polyesters such as polyethylene terephthalate and polyimides.

The substrate may preferably have a thickness of 5 to 20 $\mu m$.

Protrusion

Fine protrusions or bosses 16 as shown in FIG. 1 have a height h of 30 to 300 Å, and more particularly, 50 to 200 Å. The protrusions provided in the present invention have such dimensions that they are not observable under an optical microscope or measurable by a probe type surface roughness meter, but can only be observable under a scanning electron microscope. Larger protrusions in excess of 300 Å which are observable under an optical microscope are not desirable because of deterioration in electromagnetic properties and movement stability. Smaller protrusions of lower than 30 Å are not effective in improving physical properties.

Figure 2:
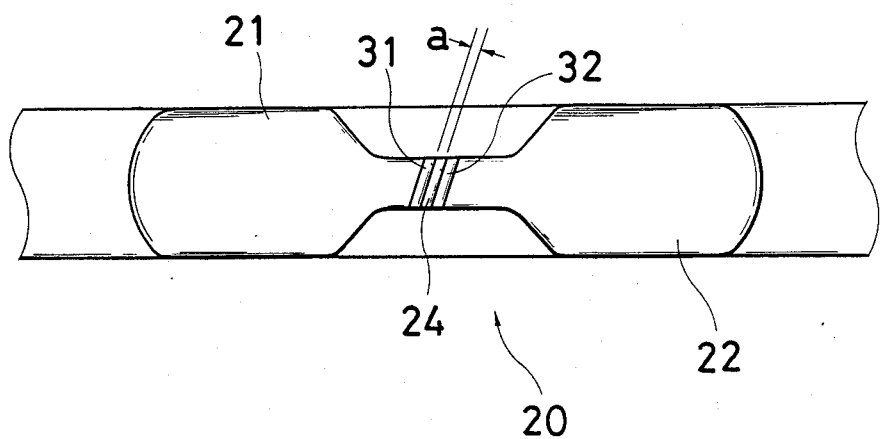
FIG. 2 is an elevation of one example of a magnetic head used in the method of the present invention.

The protrusions should be distributed on the surface of the magnetic recording medium at an average density of at least $10^5/a^2$, and more preferably $2 \times 10^5/a^2$ to $1 \times 10^9/a^2$ per square millimeter of the surface. A magnetic head 20 with which the magnetic recording medium of the present invention is used is provided with a gap 24 having a distance a as shown in FIG. 2. The gap distance a usually ranges from 0.1 $\mu m$ to 0.5 $\mu m$, and more preferably, from 0.1 $\mu m$ to 0.4 $\mu m$. At protrusion densities of less than $10^5/a^2/mm^2$, and more particularly less than $2 \times 10^5/a^2/mm^2$, there result increased noise, deteriorated still performance, and other disadvantages, which are undesirable in practical applications. Higher protrusion densities of more than $10^9/a^2/mm^2$ are rather less effective in improving physical properties because of deterioration in electromagnetic properties.

The protrusions 16 may generally be provided by placing submicron particles 15 on the surface of the substrate as clearly shown in FIG. 1. The submicron particles used herein have a particle size of 30 to 300 Å, and more preferably 50 to 200 Å. Submicron protrusions are then formed on the topcoat surface of the magnetic recording medium which conform to the submicron particles on the substrate surface in shape and size.

The submicron particles used in the practice of the present invention are those generally known as colloidal particles. Examples of the particles which can be used herein include $SiO_2$ (colloidal silica), $Al_2O_3$ (alumina sol), MgO, $TiO_2$, ZnO, $Fe_2O_3$, zirconia, CdO, NiO, $CaWO_4$, $CaCO_3$, $BaCO_3$, $CoCO_3$, $BaTiO_3$, Ti (titanium black), Au, Ag, Cu, Ni, Fe, various hydrosols, and resinous particles. Inorganic particles are preferred among others.

The submicron particles may be placed on the substrate surface, for example, by dispersing them in a suitable solvent to form a dispersion, and applying the dispersion to the substrate followed by drying. Any aqueous emulsion containing a resinous component may also be added to the particle dispersion before it is applied to the substrate. The addition of a resinous component allows gently-sloping protrusions to form in conformity to the particles although it is not critical in the present invention.

Alternatively, the submicron particles may be contained in the topcoat layer to provide protrusions rather than the placement of particles on the substrate surface.

Magnetic layer

The magnetic recording medium of the present invention has a magnetic layer on a substrate. The magnetic layer is of continuous ferromagnetic metal thin film type coextending over the substrate and is generally based on cobalt. In preferred embodiments of the present invention, the magnetic layer may preferably consist essentially of cobalt; cobalt and oxygen; cobalt, oxygen and nickel and/or chromium. That is, the magnetic layer may consist essentially of cobalt alone or a mixture of cobalt with nickel and/or oxygen.

Where the layer consists essentially of cobalt and nickel, the weight ratio of Co/Ni may preferably be at least about 1.5.

The magnetic layer may further contain oxygen in addition to cobalt or cobalt and nickel. The presence of oxygen contributes to further improvements in electromagnetic characteristics and runnability. In this case, the atomic ratio of O/Co (when nickel free) or O/(Co+Ni) is preferably not more than about 0.5, and more preferably from about 0.05 to 0.5.

Better results are obtained when the ferromagnetic metal thin film layer contains chromium in addition to cobalt; cobalt and nickel; cobalt and oxygen; or cobalt, nickel, and oxygen. The presence of chromium contributes to further improvements in electromagnetic characteristics, output level, signal-to-noise (S/N) ratio, and film strength. In this case, the weight ratio of Cr/Co (when nickel free) or Cr/(Co+Ni) is preferably in the range of about 0.001 to 0.1, and more preferably about 0.005 to 0.05.

On the surface of the ferromagnetic metal thin film layer, oxygen forms oxides with ferromagnetic metals Co and Ni. In Auger spectroscopy, peaks indicative of oxides appear in a surface layer, particularly in a surface layer from the surface to a depth of 50 to 500 Å, more preferably 50 to 200 Å. This oxide layer has an oxygen content of the order of 0.5 to 1.0 in atomic ratio. No particular limit is imposed on the concentration gradient of oxygen in the ferromagnetic metal thin film layer.

The ferromagnetic metal thin film layer may further contain trace elements, particularly transition metal elements, for example, Fe, Mn, V, Zr, Nb, Ta, Ti, Zn, Mo, W, Cu, etc.

The ferromagnetic metal thin film layer preferably consists of a coalescence of Co base particles of columnar structure oriented oblique to the normal to the substrate. More specifically, the axis of particles of columnar structure is preferably oriented at an angle of about 10 to 70 degrees with respect to the normal to the major surface of the substrate. Each columnar particle generally extends throughout the thickness of the thin film layer and has a minor diameter of the order of 50 to 500 angstroms. Cobalt and optional metals such as nickel and chromium form the columnar structure particles themselves while oxygen, when added, is generally present on the surface of each columnar structure particle in the surface layer essentially in the form of oxides. The ferromagnetic metal thin film layer generally has a thickness of about 0.05 to 0.5 $\mu$m, and preferably about 0.07 to 0.3 $\mu$m.

The magnetic layer is generally formed by the so-called oblique incidence evaporation process. The oblique incidence evaporation process may be any of well-known techniques preferably using an electron beam gun while the minimum incident angle with respect to the normal to the substrate is preferably 30 degrees. Evaporation conditions and post-treatments are well known in the art and any suitable ones may be selected therefrom. One effective post-treatment is a treatment for incorporating oxygen into the magnetic layer, which is also well known in the art. For further information about this evaporation process, reference should be made to D. E. Speliotis et al., "Hard magnetic films of iron, cobalt and nickel", *J. Appl. Phys.*, 36, 3,972 (1965) and Y. Maezawa et al., "Metal thin film video tape by vacuum deposition", IERE Conference Proceedings 54 (The Fourth International Conference on Video and Data Recording, The University of Southampton, Hampshire, England, Apr. 20-23, 1982), pp. 1-9.

The ferromagnetic metal thin film layer may be formed on the substrate either directly or via an undercoat layer of the well-known type. Further, the ferromagnetic metal thin film lager is generally formed as a single layer, but in some cases, it may be made up from a plurality of laminated sub-layers with or without an intermediate non-ferromagnetic metal thin film layer interposed therebetween.

The ferromagnetic metal thin film layer may be formed by any well-known techniques including evaporation, ion plating, and metallizing, and more preferably by the so-called oblique incidence evaporation process. The oblique incidence evaporation process may be any of well-known techniques preferably using an electron beam gun while the minimum incident angle with respect to the normal to the substrate is preferably at least 20 degrees. Incident angles of less than 20 degrees result in deteriorated electromagnetic properties. The evaporation atmosphere may generally be an inner atmosphere of argon, helium or vacuum containing oxygen gas at a pressure of about $10^{-5}$ to $10^0$ Pa. Those skilled in the art will readily select other evaporation parameters including source-substrate spacing, substrate feed direction, can and mask configurations and arrangement, and the like, through a simple experiment if necessary.

Evaporation in an oxygen-containing atmosphere causes a metal oxide film to form on the surface of the resulting magnetic layer. The partial pressure of oxygen gas necessary to allow for oxide formation may be readily determined through a simple experiment.

A metal oxide coating may be formed on the surface of the magnetic layer by an oxidizing treatment. Any of the following oxidizing treatments may be employed for this purpose.

(1) Dry treatment (a) Energy particle treatment Oxygen may be directed as energy particles to the magnetic layer at the final stage of evaporation process by means of an ion gun or neutron gun as described in Japanese Patent Application No. 58-76640.

(b) Glow treatment

The magnetic layer is exposed to a plasma which is created by generating a glow discharge in an atmosphere containing $O_2$, $H_2O$ or $O_2+H_2O$ in combination with an inert gas such as Ar and $N_2$.

(c) Oxidizing gas

An oxidizing gas such as ozone and heated steam is blown to the magnetic layer.

(d) Heat treatment

Oxidation is effected by heating at temperatures of about 60° to 150° C.

(2) Wet Treatment (a) Anodization (b) Alkali treatment (c) Acid treatment

Chromate treatment, permanganate treatment, phosphate treatment (d) Oxidant treatment $H_2O_2$ Topcoat On the ferromagnetic metal thin film layer preferably having protrusions is formed a specific organic topcoat layer according to the present invention. The topcoat layer formed in the practice of the present invention contains a radiation-curable compound, an anti-oxidant, and optionally a lubricant.

The radiation-curable polymer, monomer and oligomer used in the topcoat layer in the practice of the present invention may be those thermoplastic resins having contained or incorporated in their molecule radicals susceptible to crosslinking or polymerization upon exposure to radiation, for example, acrylic double bonds as given by acrylic and methacrylic acids having an unsaturated double bond capable of radical polymerization or esters thereof; allyl double bonds as given by diallyl phthalate; and unsaturated bonds as given by maleic acid and maleic derivatives.

Monomers which can be used as the polymer component in the practice of the present invention include acrylic acid, methacrylic acid, and acrylamide.

Those polymer having a double bond may be obtained by modifying various polyesters, polyols, polyurethanes and analogues with compounds having an acrylic double bond. If desired, polyhydric alcohols or polyhydric carboxylic acids may be blended to obtain compounds having varying molecular weights.

The foregoing examples are only a part of the radiation sensitive resins used herein. They may also be used alone or in admixture.

The preferred organic binder in the topcoat layer is a composition comprising (A) 20 to 70% by weight of a plastic compound having at least two radiation-curable unsaturated double bonds and a molecular weight of 5,000 to 100,000, (B) 20 to 80% by weight of a rubber-like compound having at least one radiation-curable unsaturated double bond or not being radiation curable and having a molecular weight of 3,000 to 100,000, and (C) 10 to 40% by weight of a compound having at least one radiation-curable unsaturated double bond and a molecular weight of 200 to 3,000.

The components (A), (B), and (C) used in the backcoat binder according to the invention should contain per molecular at least 2, and preferably at least 5 unsaturated double bonds for (A), at least 1, and preferably at least 5 unsaturated double bonds for (B), and at least 1, and preferably at least 3 unsaturated double bonds for (C).

The plastic compound used as (A) in the backcoat binder according to the invention contains in its molecular chain at least two unsaturated double bonds capable of generating radicals upon exposure to radiation to produce a crosslinked structure. Such a compound may also be obtained by modifying a thermoplastic resin so as to be radiation sensitive.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bands as given by diallyl phthalate, and unsaturated bonds as given by maleic acid and maleic derivatives. Other compounds having unsaturated double bonds capable of crosslinking or polymerizing upon exposure to radiation may also be used as long as they have a molecular weight of 5,000 to 100,000, and preferably 10,000 to 80,000.

Typical of the resins in the form of thermoplastic resins having contained in their molecule groups capable of crosslinking or polymerizing upon exposure to radiation are unsaturated polyester resins. Polyester resins having radiation-curable unsaturated double bonds in their molecular chain are included, for example, unsaturated polyester resins which may be prepared by a standard process of esterifying polybasic acids of (2) as described below and polyhydric alcohols into saturated polyester resins except that the polybasic acids are partially replaced by maleic acid so that the resulting polyesters may have radiation-curable unsaturated double bonds.

The radiation-curable unsaturated polyester resins may be prepared by adding maleic acid or fumaric acid to at least one polybasic acid and at least one polyhydric alcohol, conducting water- or alcohol-removing reaction in a conventional manner, that is, in a nitrogen atmosphere at 180° to 200° C. in the presence of a catalyst, raising the temperature to 240° to 280° C., and conducting condensation reaction at the temperature under a vacuum of 0.5 to 1 mmHg. The amount of maleic or fumaric acid added may be 1 to 40 mol %, and preferably 10 to 30 mol % of the acid reactant in consideration of crosslinking and radiation curable properties during preparation.

Examples of the thermoplastic resins which can be modified into radiation-curable resins will be described below.

(1) Vinyl chloride copolymers

Included are vinyl chloride-vinyl acetate-vinyl alcohol copolymers, vinyl chloride-vinyl alcohol copolymers, vinyl chloride-vinyl alcohol-vinyl propionate copolymers, vinyl chloride-vinyl acetate-maleic acid copolymers, vinyl chloride-vinyl acetate-OH terminated, alkyl branched copolymers, for example, VROH, VYNC, VYBGX, VERR, VYES, VMCA, and VAGH (all trade names, manufactured by U.C.C.), and analogues. These copolymers may be modified to be radiation sensitive by incorporating acrylic, maleic, or allyl double bonds by a procedure as will be described later.

(2) Saturated polyester resins

Included are saturated polyesters obtained by esterifying saturated polybasic acids such as phthalic acid, isophthalic acid, terephthalic acid, succinic acid, adipic acid, sebasic acid, etc. with polyhydric alcohols such as ethylene glycol, diethylene glycol, glycerine, trimethylolpropane, 1,2-propyleneglycol, 1,3-butanediol, dipropyleneglycol, 1,4-butanediol, 1,6-hexanediol, pentaerithritol, sorbitol, neopentylglycol, 1,4-cyclohexanedimethanol, etc., and products obtained by modifying these resins with $SO_3Na$ or the like, for example, Vyron 53S (trade name, Toyobo K.K.). They may be modified to be radiation sensitive.

(3) Polyvinyl alcohol resins

Included are polyvinyl alcohol, butyral resins, acetal resins, formal resins, and copolymers of such units. They may be modified to be radiation sensitive by acting on the hydroxyl group in them by a procedure as will be described later.

(4) Epoxy resins and phenoxy resins

Included are epoxy resins formed by reaction of bisphenol-A with epichlorohydrin and methyl epichlorohydrin, for example, Epicoat 152, 154, 828, 1001, 1004, and 1007 (trade names, manufactured by Shell Chemicals), DEN 431, DER 732, DER 511 and DER 331 (trade names, manufactured by Dow Chemicals), Epichlon 400 and 800 (trade names, manufactured by Dai-Nihon Ink K.K.); phenoxy resins which are epoxy resins having a high degree of polymerization, for example, PKHA, PKHC, and PKHH (trade names, manufactured by U.C.C.); and copolymers of brominated bisphenol-A with epichlorohidrin, for example, Epichlon 145, 152, 153, and 1120 (trade names, manufactured by Dai-Nihon Ink K.K.). These resins may be modified to be radiation sensitive by using an epoxy group contained therein.

(5) Cellulosic derivatives

A variety of cellulosic derivatives may be used although nitrocellulose, cellulose acetobutyrate, ethyl cellulose, butyl cellulose, acetyl cellulose, and analogues are preferred. These resins may be modified to be radiation sensitive by using a hydroxyl group contained therein.

Additional examples of the resins which can be subjected to radiation sensitive modification include polyfunctional polyester resins, polyether-ester resins, polyvinyl pyrrolidone resins and derivatives (e.g., PVP-olefin copolymers), polyamide resins, polyimide resins, phenol resins, spiro-acetal resins, hydroxyl-containing acrylic esters, and acrylic resins containing at least one methacrylate as a polymer component.

The high molecular weight compounds used as component (B) in the binder composition according to the invention are thermoplastic elastomers and prepolymers, and derivatives thereof modified to be radiation sensitive. The radiation sensitive modified compounds are more effective. Examples of the elastomers and prepolymers are presented below.

(1) Polyurethane elastomers and prepolymers

Polyurethanes are very useful because of abrasion resistance and adhesion to substrates, for example, PET films.

Illustrative polyurethane elastomers and prepolymers are condensation products from (a) polyfunctional isocyanates such as 2,4-toluenediisocyanate, 2,6-toluenediisocyanate, 1,3-xylenediisocyanate, 1,4-xylenediisocyanate, 1,5-naphthalenediisocyanate, m- phenylenediisocyanate, p-phenylenediisocianate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodur L, Desmodur N (trade names, manufactured by Farbenfabriken Bayer A.G.), etc.; and (b) linear saturated polyesters as produced through polycondensation from polyhydric alcohols (such as ethylene glycol, diethylene glycol, glycerine, trimethylol propane, 1,4-butanediol, 1,6-hexanediol, pentaerythritol, sorbitol, neopentylglycol, 1,4-cyclohexanedimethylol, etc.) and saturated polybasic acids (such as phthalic acid, isophthalic acid, terephthalic acid, succinic acid, adipic acid, sebasic acid, etc.); linear saturated polyethers such as polyethylene glycol, polypropylene glycol, and polytetramethylene glycol; caprolactam; polyesters such as hydroxyl-containing acrylates and hydroxyl-containing methacrylates, and the like. It is very useful to react the isocyanate or hydroxyl terminal group of these urethane elastomers with a monomer having an acrylic or allyl double bond to modify them to be radiation sensitive. Polymers may also contain hydroxy or carboxyl terminal groups as polar groups.

(2) Acrylonitrile-butadiene copolymerized elastomers

Acrylonitrile-butadiene copolymerized prepolymers having a hydroxyl terminal group commercially available as Poly BD Liquid Resin from Sinclair Petro-Chemical and elastomers commercially available as Hiker 1432J from Nihon Zeon K.K. are adequate because the double bond in the butadiene unit is capable of generating a radical upon exposure to radiation to facilitate crosslinking and polymerization.

(3) Polybutadiene elastomer

Low molecular weight prepolymers having a hydroxyl terminal group commercially available as Poly BD Liquid Resin R-15 from Sinclair Petro-Chemical and the like are preferred because they are compatible with thermoplastic resins. R-15 prepolymers whose molecule is terminated with a hydroxyl group can be more radiation sensitive by adding an acrylic unsaturated double bond to the molecule end, which is more advantageous as the binder component.

Also, cyclic products of polybutadienes commercially available as CBR-M901 from Nihon Synthetic Rubber K.K. offer satisfactory quality when combined with thermoplastic resins.

Additional preferred examples of the thermoplastic elastomers and prepolymers include styrene-butadiene rubbers, chlorinated rubbers, acrylic rubbers, isoprene rubbers, and cyclic products thereof (commercially available as CIR 701 from Nihon Synthetic Rubber K.K.) while elastomers, for example, epoxy-modified rubbers and internally plasticized, saturated linear polyesters (commercially available as Vyron #300 from Toyobo K.K.) may also be useful provided that they are subjected to radiation sensitive modification as will be described later.

Finally, component (C) or radiation-curable resins having unsaturated double bonds used in the topcoat composition according to the invention will be described.

Included are styrene, ethylacrylate, ethylene glycol diacrylate, ethylene glycol acrylate, diethylene glycol dimethacrylate, 1,6-hexaneglycol diacrylate, 1,6-hexaneglycol dimethacrylate, trimethylolpropane triacrylate, trimethylolpropane trimethacrylate, polyfunctional oligoester acrylate (e.g., Aronix M-5400, 5500, 5700, 7100 manufactured by Toa Synthetic K.K.), acryl-modified products of urethane elastomers (e.g., Nippolan 4040), and products thereof having a functional group like COOH incorporated therein.

Next, processes for the synthesis of the radiation curable binders will be described.

(a) Synthesis of acryl-modified products (radiation sensitive modified resins) of vinyl chloride-vinyl acetate copolymeric resins.

A 5-liter four-necked flask is charged with 750 parts of a partially saponified vinyl chloride-vinyl acetate copolymer having a OH group (average polymerization degree n=500), 1250 parts of toluene, and 500 parts of cyclohexanone. After the flask is heated at 80° C. to dissolve the contents into a solution, 61.4 parts of 2-hydroxyethyl methacrylate adduct of tolylenediisocyanate (the preparation will be described later) is added and then, 0.012 parts of tin octylate and 0.012 parts of hydroquinone are added. Reaction is continued in a N$_2$ stream at 80° C. until the reaction rate of NCO reaches 90%. At the end of reaction, the reaction solution is cooled and 1250 parts of methyl ethyl ketone is added for dilution.

Preparation of 2-hydroxyethyl methacrylate (2HEMA) adduct of tolylenediisocyanate (TDI)

In a 1-liter four-necked flask, 1348 parts of TDI is heated at 80° C. in a N stream. A mixture of 260 parts of 2-ethylene methacrylate, 0.07 parts of tin octylate, and 0.05 parts of hydroquinone is then added dropwise while the reactor is cooled so as to control the temperature to 80° to 85° C.

After the dropwise addition, the reaction is continued to completion at 80° C. for 3 hours with stirring. At the end of reaction, the contents are taken out of the flask and cooled, obtaining a white paste-like product which is 2HEMA adduct of TDI based on the preparation method.

(b) Synthesis of acryl-modified products (radiation sensitive modified resins) of butyral resins A 5-liter four-necked flask is charged with 100 parts of a butyral resin (BM-S, manufactured by Sekisui Chemicals K.K.), 191.2 parts of toluene, and 71.4 parts of cyclohexanone. After the flask is heated at 80° C. to dissolve the contents into a solution, 7.4 parts of 2HEMA adduct of TDI (synthesized as above) is added and then, 0.015 parts of tin octylate and 0.015 parts of hydroquinone are added. Reaction is continued in a N$_2$ stream at 80° C. until the reaction rate of NCO reaches or exceeds 90%. At the end of reaction, the reaction solution is cooled and an amount of methyl ethyl ketone is added for dilution.

(c) Synthesis of acryl-modified products (radiation sensitive modified resins) of saturated polyester resins A four-necked flask is charged with 100 parts of a saturated polyester resin (Vyron RV-200, manufactured by Toyobo K.K.), 116 parts of toluene, and 116 parts of methyl ethyl ketone. After the flask is heated at 80° C. to dissolve the contents into a solution, 3.55 parts of 2HEMA adduct of TDI (synthesized as above) is added and the, 0.007 parts of tin octylate and 0.007 parts of hydroquinone are added. Reaction is continued in a N stream at 80° C. until the reaction rate of NCO reaches or exceeds 90%.

(d-1) Synthesis of acryl-modified products (radiation sensitive modified resins) of epoxy resins After 400 parts of an epoxy resin (Epicoat 1007, manufactured by Shell Chemicals) is dissolved in 50 parts of toluene and 50 parts of methyl ethyl ketone by heating, 0.006 parts of N,N-dimethylbenzylamine and 0.003 parts of hydroquinone are added. The temperature is raised to 80° C. and 69 parts of acrylic acid is added dropwise. Reaction is continued until the acid value is lowered to below 5.

(d-2) Synthesis of acryl-modified products (radiation sensitive modified resins) of phenoxy resins A 3-liter four-necked flask is charged with 600 parts of a OH group-bearing phenoxy resin (PKHH manufactured by U.C.C., molecular weight 30,000) and 1,800 parts of methyl ethyl ketone. After the flask is heated at 80° C. to dissolve the contents into a solution, 6.0 parts of 2HEMA adduct of TDI (synthesized as above) is added and then, 0.012 parts of tin octylate and 0.012 parts of hydroquinone are added. Reaction is continued in a $N_2$ stream at 80° C. until the reaction rate of NCO reaches or exceeds 90%. The resultant modified phenoxy product has a molecular weight of 35,000 and one double bond per molecule.

(e) Synthesis of acryl-modified products (radiation-curable modified resins) of urethane elastomers A reactor is charged with 250 parts of a urethane prepolymer of isocyanate-terminated diphenylmethane diisocyanate (MDI) type (Nippolan 3119 manufactured by Nippon Polyurethane K.K.), 32.5 parts of 2HEMA, 0.07 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

(f) Synthesis of acryl-modified products (radiation-curable modified elastomers) of terminally urethane-modified polyether elastomers A reactor is charged with 250 parts of a polyether (PTG-500 manufactured by Nippon Polyurethane K.K.), 32.5 parts of 2HEMA, 0.007 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

(g) Synthesis of acryl-modified products (radiation-curable modified elastomers) of polybutadiene elastomers A reactor is charged with 250 parts of a low-molecular weight, hydroxyl-terminated polybutadiene (Poly BD Liquid Resin R-15, manufactured by Sinclair Petro-Chemical), 32.5 parts of 2HEMA, 0.007 parts of hydroquinone, and 0.009 parts of tin octylate and heated at 80° C. to dissolve the contents into a solution. While the reactor is cooled so as to control the temperature to 80° to 90° C., 43.5 parts of TDI is added dropwise. At the end of addition, reaction is continued at 80° C. until the reaction rate reaches or exceeds 95%.

Among known polymers, polymers of one type degrade while polymers of another type give rise to crosslinking between molecules upon exposure to radiation.

Included in the crosslinking type are polyethylene, polypropylene, polystyrene, polyacrylate, polyacrylamide, polyvinyl chloride, polyester, polyvinyl pyrrolidone rubber, polyvinyl alcohol, and polyacrolein. Since these polymers of the crosslinking type give rise to crosslinking reaction without any particular modification as previously described, they may also be used as the radiation-curable backcoat resin as well as the above-mentioned modified products. The polymers of the crosslinking type can be cured within a short time even when used in solventless form. The use of polymers of this type is thus very useful as the topcoat resin.

The polymers may have functional groups such as a hydroxy group derived from alcohols, phenols and phosphates, a carboxyl group derived from aromatic and aliphatic compounds, a sulfone group, an amino group, and an ammonium group. The use of compounds having functional groups improves the adhesion of the topcoat to the ferromagnetic thin layer.

Particularly preferred for the radiation curable resin composition used in the topcoat according to the invention are combinations of component (A) selected from partially saponified vinyl chloride-vinyl acetate copolymers having carboxylic units incorporated therein, vinyl chloride-vinyl acetate-vinyl alcohol-maleic acid copolymers, epoxy resins, and compounds prepared by reacting isocyanate-bearing compounds resulting from reaction between phenoxy resins preferably having carboxylic units such as phthalic acid, isophthalic acid, terephthalic acid, adipic acid, and sebasic acid incorporated therein, and polyisocyanate compounds with acrylic or methacrylic compounds having a functional group capable of reacting with the isocyanate group, component (B) selected from compounds prepared by reacting isocyanate compounds or polyols (polyurethane elastomers preferably having hydroxy or carboxyl group incorporated therein) resulting from reaction between polyols and isocyanates with acrylic or methacrylic compounds having a reactive functional group, component (C) selected from polyfunctional acrylate or methacrylate monomers, oligoester acrylates, and low molecular weight compounds of (B).

These compounds may be used alone or in admixture of two or more.

The use of the radiation-curable compounds not only improves the adhesion of the topcoat layer to the magnetic layer, but also reinforces the topcoat layer, that is, increases the breakage strength and abrasion resistance of the topcoat layer, resulting in stable movement in high-temperature conditions. There is thus obtained a magnetic recording medium which is improved in dropout, head adhesion, topcoat abrasion, and friction variation with use. A roll of the magnetic recording medium being taken up during manufacture is no longer tightened during curing process so that the medium has uniform properties in a lengthwise direction.

In the absence of the radiation-curable compounds in the topcoat layer, the movement of the resulting tape at elevated temperatures is often obstructed because the topcoat layer is severely abraded away to cause debris deposition on the head.

The use of radiation-curable binders allows the topcoat to be continuously formed on a manufacturing line, contributing to energy and cost savings.

Any anti-oxidants may be used herein as long as they can prevent oxidation of metals. The anti-oxidants used herein may be selected from conventional anti-oxidants which may be generally classified into the following groups:

(1) Phenolic anti-oxidants
(2) Amine anti-oxidants
(3) Phosphorous anti-oxidants
(4) Sulfur anti-oxidants (5) Organic acid, alcohol and ester anti-oxidants
(6) Quinone anti-oxidants
(7) Inorganic acid and inorganic salt anti-oxidants.

Examples of each of these anti-oxidants are shown below.

(1) Phenolic anti-oxidants
2,6-di-tert-butyl-p-cresol,
2,6-di-tert-butylphenol,
2,4-dimethyl-6-tert-butylphenol,
butylhydroxyanisole,
2,2'-methylenebis(4-methyl-6-tert-butylphenol),
4,4'-butylidenebis(3-methyl-6-tert-butylphenol),
4,4'-thiobis(3-methyl-6-tert-butylphenol),
tetrakis[methylene-3-(3,5-di-tert-butyl-4hydroxyphenyl)propionate]methane,
1,1,3-tris(2-methyl-4-hydroxy-5-tert-butylphenyl)butane,
dibutylhydroxytoluene,
propyl gallate,
guaiacum resin,
nordihydroguaiaretic acid, etc.

Also included are phenolic anti-oxidants of radiation curable type, for example, acrylate and methacrylate modified compounds of monoglycol salicylate, 2,5-di-tert-butylhydroquinone, 2,4-dihydroxybenzophenone, 2,4,5-trihydroxybutyrophenone, hydroquinone, etc.

(2) Amine anti-oxidants
phenyl-$\beta$-naphthylamine,
$\alpha$-naphthylamine,
N,N'-di-sec-butyl-p-phenylenediamine,
phenothiazine,
N,N'-diphenyl-p-phenylenediamine,
alkanol amines,
phospholipid, etc.

Also included are amine anti-oxidants of radiation curable type, for example, dimethylaminoethyl methacrylate and acrylate, and vinyl derivatives.

(3) Phosphorous anti-oxidants

Included are phosphate esters of both radiation curable and radiation uncurable types. The R moiety of phosphates may include alkyl radicals, alkyl phenyl radicals, ethylene oxide, propylene oxide, etc. and preferably contain 1 to 26 carbon atoms, and most preferably 1 to 22 carbon atoms. The phosphates include mono-, di-, and tri-esters and they may be used alone or in admixture. Mixtures comprising a major proportion of mono- and di-esters are preferred and the tri-esters may be excluded.

Also included in the phosphate esters are $NH_4$ type and methacrylate, acrylate, and vinyl modified types.

Illustrative examples include phosphites such as triphenyl phosphite, trioctadecyl phosphite, tridecyl phosphite, trilauryl trithiophosphite, etc.; hexamethyl phosphoric triamide, butyl phosphate, cetyl phosphate, butoxyethyl phosphate, 2-ethylhexyl phosphate, $\beta$-chloroethyl phosphate, butoxyethyl phosphate diethylamine salt, di(2-ethylhexyl) phosphate, ethyleneglycol acid phosphate; methacrylate and acrylate phosphates such as 2-hydroxyethylmethacrylate phosphate, butylhydroxymethacrylate phosphate, caprylhydroxylmethacrylate phosphate, myristylhydroxymethacrylate phosphate, stearylhydroxymethacrylate phosphate, cetylhydroxymethacrylate phosphate, butylphenylhydroxymethacrylate phosphate, amylphenylhydroxymethacrylate phosphate, nonylphenylhydroxymethacrylate phosphate, and similar acrylate phosphates; phenyl phosphates such as phenyl phosphate and nonyl phosphate; alcoholic phosphates; vanadium series acidic phosphates, and the like.

The phosphate esters may be prepared by any well-known methods, for example, as disclosed in Japanese Patent Publication No. 57-44223.

(4) Sulfur anti-oxidants
dilaurylthiodipropionate,
distearylthiodipropionate,
laurylstearylthiodipropionate,
dimyristylthiodipropionate,
distearyl-$\beta,\beta'$-thiobutyrate,
2-mercaptobenzoimidazole,
dilaurylsulfide., etc.

Also included are radiation curable methacrylate, acrylate modified compounds of 4,4'-thio-bis(3-methyl-6-tert-butylphenol), 2,2'-thio-bis(4-methyl-6-tert-bytylphenol), etc. They may further contain ethylene oxide and propylene oxide units.

(5) Organic acid, alcohol, and ester anti-oxidants

Included are sorbitol, glycerine, propylene glycol, adipic acid, citric acid, ascorbic acid, etc. as well as radiation curable derivatives thereof.

(6) Quinone anti-oxidants

Included are hydroquinone, tocopherol, etc. as well as radiation curable derivatives thereof.

(7) Inorganic acid and inorganic salt anti-oxidants

Phosphoric acid is a typical example.

In order to minimize the transfer of the topcoat substance to the back surface of the magnetic recording medium in a roll form, radiation curable anti-oxidants having an acrylic double bond in their molecule are preferred, for example, monoglycol salicylate methacylate and acrylate, 4-tert-butylcatechol methacrylate and acrylate, dimethylaminoethyl methacrylate and acrylate, ethylhydroxymethacrylate and acrylate phosphates, cetylhydroxyphosphate methacrylate and acrylate, stearyl methacrylate and acrylate phosphates, and phenyl derivatives of the foregoings, 2,2'-thio-bis(4-methyl-6-tert-butylphenol) methacrylate and acrylate, etc.

The radiation curable anti-oxidants can be on-line cured to the ferromagnetic thin film during manufacturing, eliminating the deterioration of surface properties or output reduction due to subsequent heat curing which makes a roll tighter to cause the conformity of the topcoat layer to the surface morphology of the back side.

The topcoat is formed on the ferromagnetic thin film to a thickness of 10 to 100 Å, and more preferably to a thickness of 10 to 50 Å, as will be described hereinafter. Thicker topcoats result in a loss of electromagnetic properties and can be abraded away during operation, resulting in clogging of head gaps. Too thin topcoats are not effective.

The use of the radiation curable anti-oxidants offers benefits in properties including prevention of dropouts and reduction of the output difference between outer and inner coils in a roll form, as well as the benefit of on-line production.

The lubricants used in the topcoat layer in the practice of the present invention may be conventional lubricants commonly used in prior art magnetic recording media, for example, silicone oil, fluorine oil, fatty acids, fatty acid esters, paraffins, liquid paraffins, and surface active agents, etc. Among others, preferred are fatty acids and/or fatty acid esters.

Examples of the fatty acids used herein include fatty acids having at least 12 carbon atoms, more illustratively, RCOOH where R is an alkyl having at least 11 carbon atoms, such as caprylic acid, capric acid, lauric acid, myristic acid, palmitic acid, stearic acid, behenic acid, oleic acid, elaidic acid, linolic acid, linoleic acid, stearolic acid, etc.

The fatty acid esters used herein may be those esters of monobasic fatty acids having 12 to 16 carbon atoms with monohydric alcohols having 3 to 12 carbon atoms, and those esters of monobasic fatty acids having at least 17 carbon atoms with monohydric alcohols, the esters having 21 to 23 carbon atoms in total.

The silicone oils used herein may be fatty acid-modified silicones and partially fluorine-modified silicones. The alcohols used herein may be higher alcohols. The fluorine compounds may be those obtained by electrolytic substitution, telomerization, and oligomerization.

Also, lubricants of radiation curable type may be used and preferred. The use of the radiation curable lubricants prevents the conformity of the topcoat layer to the surface morphology of the back side of the medium in a roll form and thus offers benefits in properties including prevention of dropouts and reduction of the output difference between outer and inner coils in a roll form, as well as the benefit of on-line production.

The radiation curable lubricants are compounds having a chain moiety capable of providing lubricity and an acrylic double bond in their molecule, for example, acrylates, methacrylates, vinyl acetates, acrylamides, vinyl alcohol esters, methylvinyl alcohol esters, allylalcohol esters, glycerides, etc.

These lubricants may be represented by the following structural formulas:

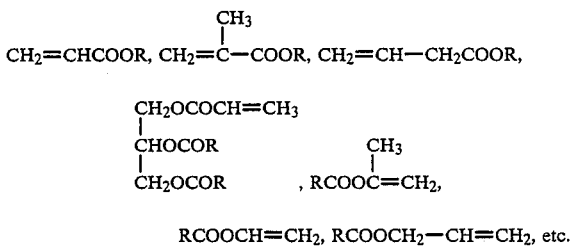

where R is selected from straight chain and branched, saturated and unsaturated, hydrocarbon radicals having at least 7 carbon atoms, preferably 12 to 23 carbon atoms. These compounds may be substituted with fluorine. The fluorine-substituted lubricants may be represented by the following structural formulas:

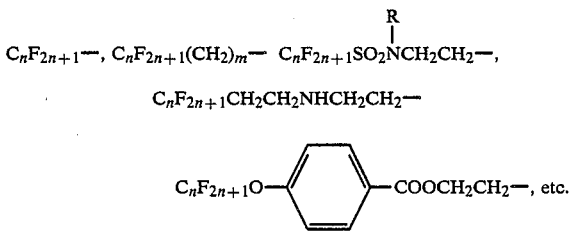

where m has a value from 1 to 5. Preferred examples of the radiation curable lubricants include stearic acid methacrylate and acrylate, methacrylate and acrylate of strearyl alcohol, glycerine methacrylate and acrylate, glycol methacrylate and acrylate, silicone methacrylate and acrylate, vinyl stearate, vinyl myristate, etc.

The topcoat layer contact compound, anti-oxidant, and optionally lubricant may be formed on the surface of the ferromagnetic thin film by any desired techniques, for example, by diluting the components in a solvent and thinly applying the resulting solution onto the ferromagnetic thin film, or by evaporating the components in air or inert gas or vacuum and directing the resulting vapor to the ferromagnetic thin film surface.

Various procedures may be taken, for example, by mixing the radiation-curable compound, antioxidant, and lubricant together, and applying the mixture followed by curing, or by applying and curing a mixture of the radiation-curable compound and antioxidant, coating or evaporating the lubricant onto the mixture film to form a lubricant coating or deposition. Application of these additives alone or in admixture may be carried out using a solvent. The additives may be evaporated or gas phase deposited by vaporizing them in air or inert gas or vacuum and directing the vapor to the surface of an object to be coated therewith. Application of the additives by evaporation is advantageous in producing a layer with a uniform or smooth surface, leading to improved output waveform.

The proportion of the radiation-curable compound, antioxidant, and lubricant used in the topcoat layer may be controlled such that the ratio of the radiation-curable compound to antioxidant ranges from 10:90 to 90:10, and preferably from 30:70 to 70:30 by weight. The lubricant may be added in amounts of from 0.5 to 100 parts by weight per 100 parts by weight of the radiation-curable compound plus antioxidant. Smaller amounts of the radiation-curable compound outside this range result in a topcoat layer which is less tough and liable to abrasion. Amounts of the antioxidant outside this range are too small to provide rust preventive effect. Then the ferromagnetic metal thin film tends to be corroded which in turn, causes damage to the topcoat layer, resulting in deteriorated electromagnetic properties as evidenced by an output drop.

The topcoat layer according to the present invention has many advantages attributable to the respective components. That is, the radiation-curable compound reinforces the topcoat layer which experiences less abrasion; the anti-oxidant provides a sufficient rust preventive effect; and the lubricant serves to reduce the frictional resistance on the magnetic layer surface.

These effects provide magnetic recording media with moving stability, durability or runnability, and reduced dropout.

The anti-oxidant and the lubricant contained in the topcoat layer are both preferably of radiation curable type.

Radiation

Active energy radiation used for crosslinking may include electron radiation from a radiation source in the form of a radiation accelerator, γ-ray emitted from Co60, β-ray emitted from Sr90, X-ray emitted from an X-ray generator, and ultraviolet radiation. Particularly preferred radiation for exposure is radiation generated by a radiation accelerator because of simple control of radiation dose, incorporation in a manufacturing line and electromagnetic radiation shielding. In curing the topcoat layer through exposure to radiation, it is preferred to operate a radiation accelerator at an accelerating voltage of 100 to 750 kV, and preferably 150 to 300 kV to generate radiation having a sufficient penetrating power such that the object is exposed to a radiation dose of 0.5 to 20 megarad. In the practice of radiation curing according to the present invention, it is very advantageous to use a low dose type radiation accelerator (electrocurtain system) available from Energy Science Inc. of United States America because it may be readily incorporated in a tape coating and fabricating line and internal shielding of secondary x-rays is complete. A van de Graaff type accelerator may equally be employed which have been widely used as a radiation accelerator in the prior art.

It is important in radiation crosslinking to expose the topcoat layer to radiation in a stream of an inert gas such as $N_2$ gas and He gas. Exposure to radiation in air is not desirable because $O_3$ generated by radiation exposure acts on the binder polymer to generate radicals therein which in turn, adversely affect the crosslinking reaction of the binder. It is thus important that the atmosphere where active energy radiation is irradiated be an atmosphere of an inert gas such as $N_2$, He and $CO_2$ having an oxygen concentration of 5% at the maximum.

A photo polymerization sensitizer may be added to the topcoat composition according to the present invention with the advantage of promoted ultraviolet curing. The photo polymerization sensitizers used herein may be selected from well-known sensitizers. Examples of such sensitizers include benzoins such as benzoin methyl ether, benzoin ethyl ether, α-methylbenzoin, α-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

Backcoat

The backcoat layer used in the practice of the present invention contains an inorganic pigment, an organic binder, and a lubricant.

The inorganic pigments used herein include
(1) electroconductive carbon black and graphite, and
(2) inorganic fillers such as $SiO_2$, $TiO_2$, $Al_2O_3$, $Cr_2O_3$, SiC, CaO, $CaCO_3$, zinc oxide, goethite, α-$Fe_2O_3$, talc, kaolin, $CaSO_4$, boron nitride, fluorinated graphite, molybdenum disulfate, ZnS, etc., with $CaCO_3$, kaolin, ZnO, goethite, ZnS and carbon black being preferred.

The amount of the inorganic pigment used may be 20 to 200 parts by weight for type (1) and 10 to 300 parts by weight for type (2) per 100 parts by weight of the binder. Backcoats containing higher contents of the inorganic pigment become brittle so that increased dropouts may occur.

The lubricants used in the backcoat layer along with dispersants used therefor may be selected from conventional ones commonly used in backcoats of this type in the prior art. Examples of the lubricants include fatty acids having at least 12 carbon atoms, more illustratively, RCOOH where R is an alkyl having at least 11 carbon atoms, such as caprylic acid, capric acid, lauric acid, mirystic acid, palmitic acid, stearic acid, behenic acid, oleic acid, elaidic acid, linolic acid, linoleic acid, stearolic acid, etc.; metal soaps, for example, soaps of the foregoing fatty acids with alkali metals such as Li, Na and K and alkaline earth metals such as Mg, Ca and Ba; and lecithin, etc. Also included are higher alcohols having at least 12 carbon atoms, and sulfate esters thereof, surface active agents, titanium coupling agents, silane coupling agents, etc.

Additional examples of the lubricants include silicone oil, graphite, molybdenum disulfide, tungsten disulfide, and fatty acid esters of monobasic fatty acids having 12 to 6 carbon atoms with monohydric alcohols having 3 to 12 carbon atoms, and fatty acid esters of monobasic fatty acids having at least 17 carbon atoms with monohydric alcohols, the latter esters having 21 to 23 carbon atoms in total.

The lubricants (along with the associated dispersants) may be added in an amount of 0.2 to 20 parts by weight per 100 parts by weight of the binder.

The backcoat layers may further contain any of well-known additives commonly used in backcoats of this type in the prior art.

One class of such additives includes anti-static agents, for example, natural surface active agents such as saponin; nonionic surface active agents such as alkylene oxide series, glycerine series, and glycidol series agents; cationic surface active agents such as higher alkyl amines, quaternary ammonium salts, pyridine and similar heterocyclic compounds, phosphonium salts, and sulfonium salts; anionic surface active agents such as carboxylic acids, sulfonic acid, phosphoric acid, and those containing acidic radicals such as sulfate and phosphate residues; amphoteric surface active agents such as amino acids, aminosulfonic acid, and sulfate and phosphate esters of amino-alcohols.

The binders used in the backcoat layers in the practice of the present invention may be selected from thermoplastic, thermosetting and reactive-type resins which have been commonly used in prior art magnetic recording media, and mixtures thereof. Among them, thermosetting resins, and especially radiation curable resins are preferred because of the strength of the resultant coating.

The thermoplastic resins used herein are resins having a softening point of lower than 150° C., an average molecular weight of 10,000 to 200,000, and a polymerization degree of about 200 to 2,000, for example, vinyl chloride-vinyl acetate copolymers (which may have carboxylic units incorporated therein), vinyl chloride-vinyl acetate-vinyl alcohol copolymers (which may have carboxylic units incorporated therein), vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, nylon-silicon resins, nitrocellulose-polyamide resins, polyfluorovinyl resins, vinylidene chloride-acrylonitrile copolymers, butadiene-acrylonitrile copolymers, polyamide resins, polyvinyl butyral, cellulose derivatives (such as cellulose acetate, cellulose diacetate, cellulose triacetate, cellulose propionate, nitrocellulose, etc.), styrene-butadiene copolymers, polyester resins, chlorovinyl ether-acrylate copolymers, amino resins, various synthetic rubber series thermoplastic resins, and mixtures thereof.

The thermosetting and reactive-type resins are resins which have a molecular weight of less than 200,000 in solution form to be applied, and after being applied, dried, and heated, have an infinitely increased molecular weight as a result of condensation and addition reactions. Among them, preferred are those resins which do not soften or melt before they are pyrolyzed.

Illustrative of these resins are phenol resins, epoxy resins, polyurethane setting resins, urea resins, melamine resins, alkyd resins, silicone resins, acrylic resins, acrylic reactive resins, epoxy-polyamide resins, nitrocellulose melamine resins, mixtures of high molecular weight polyester resins and isocyanate prepolymers, mixtures of methacrylate copolymers and diisocyanate prepolymers, mixtures of polyester polyols and polyisocyanates, urea-formaldehyde resins, low molecular weight glycol/high molecular weight diol/triphenylmethane triisocyanate mixtures, polyamine resins, and mixtures thereof.

Among them particularly preferred are thermosetting resin compounds comprising a cellulosic resin (pyroxylin etc.), a vinyl chloride-vinyl acetate-vinyl alcohol copolymer, and urethane with a curing agent added. Also preferred are radiation-curable resin compounds comprising a vinyl chloride-vinyl acetate-vinyl alcohol copolymer (which may have carboxylic units incorporated therein) or acrylic-modified vinyl chloride-vinyl acetate-vinyl alcohol copolymer (which may have carboxylic units incorporated therein) and urethane acrylate.

In addition to the above preferred combinations, also preferred are those thermoplastic resins having contained or incorporated in their molecule radicals susceptible to crosslinking or polymerization upon exposure to radiation, for example, acrylic double bonds as given by acrylic and methacrylic acids having an unsaturated double bond capable of radical polymerization or esters thereof; allyl double bonds as given by diallyl phthalate; and unsaturated bonds as given by maleic acid and maleic derivatives.

Monomers which can be used as the binder component in the practice of the present invention include acrylic acid, methacrylic acid, and acrylamide.

The preferred examples and their combination of radiation-curable binder in the backcoat layer are similar to those of the topcoat.

If a thermosetting organic binder is used in the manufacture of the magnetic recording medium of the present invention, the lubricant in the backcoat can be transferred to the magnetic thin film during manufacturing process, resulting in many disadvantages including unstable movement of the medium in service accompanied by output reduction or even image signal loss, rather high friction, and separation or breakage of the ferromagnetic thin film due to backward morphology transfer. These problems may be overcome by first applying the topcoat while there often occurs another problem that the medium as top coated is susceptible to damage during the process. Further, in the case of thermosetting type, the back-to-top morphology transfer caused by tightening of a jumbo roll of coated medium during thermosetting process gives rise to a difference in electromagnetic properties between outer and inner coils of the roll.

On the contrary, radiation-curable resins can be continuously cured within a relatively short time during manufacturing process, thus completely eliminating the back-to-top morphology transfer and hence, minimizing dropouts. The steps of applying and curing the topcoat can be performed on-line in the manufacturing process, contributing to cost reduction through energy consumption and labor savings. Advantages in quality are also achieved by reducing the dropout in a magnetic tape which is otherwise remarkable due to tightening during curing, and eliminating an output difference of the magnetic tape in a lengthwise direction due to the difference in stress between outer and inner coils of a roll of tape.

The radiation-curable resin binder comprising components (A), (B), and (C) will be discussed in further detail. Component (A) alone is unflexible and brittle, component (B) alone is less elastic, and combinations of (A) and (B) are sufficient to increase breaking energy, but insufficient to increase brittle energy, and become tacky to increase static friction under high temperature, high humidity conditions probably because of low hardness.

Further combining component (C) with components (A) and (B) increases the crosslinking property of the binder sufficiently to form a fully cured tough backcoat film exhibiting a high tensile strength, breaking energy, brittle energy, and abrasion resistance (being little abraded away). It has been found that magnetic recording medium samples top-coated with a binder composition of (A), (B), and (C) do not become tacky and remain low in friction coefficient and free of reproduced image distortion even after storage in a high-temperature environment at 50° C. and relative humidity 80% for 5 days. It is proved that the crosslinking property and hence, curing degree of the backcoat film is increased by the addition of (C). The addition of (C) to (A) and (B) allows component (A) having a lower molecular weight to be employed as compared with component (A) available in the case of combinations of (A) and (B). The originally plastic component (A) is improved in plasticity and curing degree by introducing component (C) so that a highly viscoelastic film having an increased brittle energy may be obtained.

The limitations on components (A), (B), and (C) constituting the radiation-curable resin binders will be briefly described. If (A) has a molecular weight of less than 5,000 and/or (B) has a molecular weight of less than 3,500, there results a too hard backcoat film which will be substantially abraded away and lead to deteriorated electromagnetic properties. If the molecular weight of (B) exceeds 100,000, there results poor dispersion and hence, deteriorated electromagnetic properties. Particularly when such (B) is of radiation curable type, its curing property is adversely affected, resulting in reduced strength If the molecular weight of (C) exceeds 3,000, crosslinking property is deteriorated and film strength is lowered.

Preferably, component (A) has a molecular weight of 10,000 to 80,000, (B) has a molecular weight of 3,000 to 80,000, and (C) has a molecular weight of 200 to 2,500. The use of component (B) of radiation-curable type is most preferred because of promoted crosslinking and increased film strength.

Components (A), (B), and (C) are blended in such proportion that the composition contains 20 to 70%, and preferably 30 to 70% of (A), 20 to 80%, and preferably 20 to 60% of (B), and 10 to 40%, and preferably 10 to 30% of (C), all percents being by weight.

It should be noted that the molecular weight of components (A), (B), and (C) used herein designates a number average molecular weight as determined by gel permeation chromatography (G.P.C.). More particularly, the G.P.C. is a liquid chromatography process of the type using a column filled with porous gel serving as a molecular sieve for separating molecules in a sample in terms of their dimensions in a mobile phase. The average molecular weight may be determined by passing a polystyrene having a predetermined molecular weight as a reference sample to depict a calibration curve on the basis of elution time. Then the average molecular weight is calculated on the polystyrene basis. If a given high molecular weight substance contains Ni molecules having a molecular weight Mi, then the number average molecular weight Mn is represented by the equation:

$$Mn = \frac{\Sigma NiMi}{\Sigma Ni}$$

The components (A), (B), and (C) used in the backcoat binder according to the invention should contain per molecular at least 2, and preferably at least 5 unsaturated double bonds for (A), at least 1, and preferably at least 5 unsaturated double bonds for (B), and at least 1, and preferably at least 3 unsaturated double bonds for (C).

Particularly preferred for the radiation curable resin composition used in the backcoat according to the invention are combinations of component (A) selected from partially saponified vinyl chloride-vinyl acetate copolymers, vinyl chloride-vinyl acetate copolymers having carboxylic units incorporated therein, and compounds prepared by reacting isocyanate-bearing compounds resulting from reaction between phenoxy resins and polyisocyanate compounds with acrylic or methacrylic compounds having a functional group capable of reacting with the isocyanate group, component (B) selected from compounds prepared by reacting isocyanate compounds or polyols (polyurethane elastomers) resulting from reaction between polyols and isocyanates with acrylic or methacrylic compounds having a reactive functional group, component (C) selected from polyfunctional acrylate or methacrylate monomers, oligoester acrylates, and low molecular weight compounds of (B).

The organic binders, lubricants and anti-oxidants used in the backcoat layer in the practice of the invention are preferably of radiation curable type.

Active energy radiation used for crosslinking, radiation source and irradiation conditions are as previously mentioned.

A photo polymerization sensitizer as previously described may also be added to the backcoat composition according to the present invention with the advantage of promoted ultraviolet curing.

In the fabrication of conventional magnetic recording media having a thermosetting backcoat layer, the backcoat layer should be formed after the formation of the magnetic layer because a roll of a backcoated substrate film experiences tightening of coils or tightened contact of the backcoat to the substrate face surface during heat treatment, undesirably reducing the surface roughness of the substrate face surface. For this reason, the magnetic layer must be formed before the heat curing process. It is thus a common practice to apply a backcoat layer to the back surface of the substrate film having a magnetic layer already formed thereon. On the contrary, the use of a radiation curable binder in the practice of the present invention allows either a topcoat or a backcoat to be formed in advance because the radiation curable binder can be cured immediately after application on a fabricating line without subsequent tightening in rolled form.

Magnetic Head

The magnetic recording medium of the present invention may be operated in combination with a variety of magnetic heads. It is preferred that at least a gap-defining edge portion of the magnetic head be of a magnetic metal material. It is possible to form a core entirely of a ferromagnetic metal material although a part of the core including a gap-defining edge portion may be formed of a ferromagnetic metal material.

FIG. 2 schematically shows a magnetic head generally designated at 20 as comprising core halves 21 and 22 formed of a ferromagnetic material such as ferrite. The core halves 21 and 22 are metallized at their gap-defining edge portions with ferromagnetic metal material layers 31 and 32 of about 1 to 5 $\mu$m thick by sputtering or any suitable metallizing techniques. The core halves 21 and 22 are mated so as to define a gap 24 therebetween which is filled with glass or dielectric material and has a distance a. This configuration, although the figure is not drawn to exact proportion and shape, provides improved electromagnetic properties and ensures smooth tape passage thereacross without head adhesion or clogging. Of course, the shape and structure of the head is well known.

In the practice of the present invention, it is desirable that the head gap 24 has a distance a of 0.1 to 0.5 $\mu$m, and preferably 0.1 to 0.4 $\mu$m, and a track width of 10 to 50 $\mu$m, and preferably 10 to 20 $\mu$m.

The ferromagnetic metal materials used in the fabrication of the magnetic head may be selected from a variety of such materials including thin films and thin plates of amorphous magnetic metals, Sendust, hard Permalloy, Permalloy, etc. Among them, particularly preferred are amorphous magnetic Co-based alloys because they experience little head adhesion or clogging and have excellent electromagnetic properties. Preferred are amorphous magnetic alloys comprising 70 to 95 atom % of Co and 5 to 20 atom % of a vitrifying element(s) such as Zr, Nb, Ta, Hf, rare earth elements, Si, B, P, C, Al, etc., with the Zr and/or Nb being most preferred. Also preferred are alloys comprising 65 to 85 atom % of Co and 15 to 35 atom % of Si and/or B as a vitrifying element. The latter alloys may further contain less than 10 atom % of Fe, less than 25 atom % of Ni, less than 20 atom % (in total) of at least one member of Cr, Ti, Ru, W, Mo, Ti, Mn, etc. Less desirable results were obtained when a Sendust head was used.

The amorphous magnetic alloys may be formed into core halves or gap-defining segments by sputtering or high speed quenching.

Recording/reproducing operation may be performed on the magnetic recording medium of the present invention by means of the above-mentioned magnetic head in accordance with any well-known video recording/reproducing systems including the so-called VHS, Beta, 8-mm video and U-standard systems.

The magnetic recording medium and recording/reproducing method according to the present invention has a number of benefits.

The magnetic recording medium exhibits sufficiently reduced dynamic friction to provide stable movement.

Runnability is outstandingly improved so that the dynamic friction increases little after repeated travel cycles in a recording/reproducing equipment. The medium tolerates an increased number of recording/reproducing operations and offers improved still characteristics (characteristics in the still mode reproduction).

Improved stability ensures that the medium can be stored and operated in severely varying environments from high-temperature high-humidity to low-temperature low-humidity environments.

Reproduction output is little affected by a spacing loss and contains less noise.

The magnetic recording medium operated in contact with a head releases little materials which will adhere to and clog the head.

These benefits are further enhanced when the medium is provided with a backcoat and used in combination with ferromagnetic metal heads, and particularly in the case of high density recording at a minimum recording wavelength of less than 1 μm.

EXAMPLES

Examples of the present invention are given below by way of illustration and not by way of limitation.

Example 1

Colloidal silica was applied onto a substantially particulate-free smooth polyester film of 12 μm thick. There was obtained a substrate having submicron particles or protrusions distributed thereon at a density of $10^7/mm^2$. The protrusions was as high as about 150 Å.

(1) Formation of magnetic layer

Ferromaonetic thin film 1

The substrate was moved along the circumferential surface of a cooled cylindrical can in a chamber which was evacuated to a vacuum of $1.0 \times 10^{-4}$ Torr. A 1:1 (by volume) mixture of $O_2$ and Ar was passed through the chamber at a flow rate of 800 cc/min. A 80/20 Co/Ni alloy was melted in the chamber and evaporated toward the substrate within the range of incident angle between 90° and 30° by the oblique evaporation technique. There was formed a Co-Ni-O thin film of 0.15 μm thick on the substrate.

Oxygen was locally concentrated at the interface with the substrate and the surface of the magnetic film remote from the substrate. The surface of the magnetic layer remote from the substrate was substantially completely covered with oxides. The magnetic film had a coercive force Hc = 1,000 Oe. The average quantity of oxygen in the magnetic film was 40% as expressed by its atomic ratio to Co and Ni, that is, $O/(Co+Ni) \times 100$.

Ferromagnetic thin film 2

A ferromagnetic thin film 2 was prepared in the same manner as for ferromagnetic thin film 1 except that the substrate was moved along the circumferential surface of a cooled cylindrical can in a chamber which was evacuated to a vacuum of $5.0 \times 10^{-6}$ Torr There was formed a thin film consisting essentially of Co-Ni and having a thickness of 0.15 μm.

The resulting tape was forcedly oxidized in an atmosphere at 9020 C. and RH 20% such that the surface of the magnetic film remote from the substrate consisted of oxides. The magnetic film had a coercive force Hc of 900 Oe. The average quantity of oxygen in the magnetic film was 45% as expressed by its atomic ratio to Co and Ni.

Ferromagnetic thin film 3 (comparison)

A ferromagnetic thin film 3 was prepared by the same evaporation process as for ferromagnetic thin film 1 except that the substrate was moved along the circumferential surface of a cooled cylindrical can in a chamber which was evacuated to a vacuum of $5.0 \times 10^{-6}$ Torr. The oxidizing treatment with oxygen as done for ferromagnetic thin film 2 was omitted. There was formed a thin film consisting essentially of Co-Ni and having a thickness of 0.15 μm and a coercive force Hc = 950 Oe.

(2) Formation of Backcoat

| Backcoat layer 1 | Parts by weight |
| --- | --- |
| Zinc oxide, 80 μm | 200 |
| Curing agent, Collonate L | 20 |
| Lubricant, stearic acid-modified silicone | 4 |
| butyl stearate | 2 |
| Nitrocellulose | 40 |
| Vinyl chloride-vinyl acetate-vinyl alcohol copolymer (Eslek A, Sekisui Chemicals K.K.) | 30 |
| Polyurethane elastomer (Essen 5703, B. F. Goodrich Co.) | 30 |
| Mixed solvent, 1/1 MIBK/toluene | 250 |

Backcoat layer 1 was formed by applying the solution to the back surface of the polyester substrate having a thickness of 15 μm, evaporating off the solvent with an infrared lamp or hot air, smoothening the surface, and heating the roll in an oven at 80° C. for 24 hours to promote isocyanate crosslinking.

| Backcoat layer 2 | Parts by weight |
| --- | --- |
| Carbon black, 100 μm (Asahi Carbon K.K.) | 50 |
| (A) Acryl-modified vinyl chloride-vinyl acetate-vinyl alcohol copolymer, MW = 45,000 | 50 |
| (B) Acryl-modified polyurethane elastomer, MW = 5,000 | 50 |
| Stearic acid | 2 |
| Butyl stearate | 2 |
| Mixed solvent, 1/1 MIBK/toluene | 300 |

Each mixture was dispersed in a ball mill for 5 hours and applied to the back surface of the polyester substrate having the magnetic layer already formed thereon to a dry thickness of 1 μm. The resulting backcoat layer was exposed to electronic radiation using an electronic curtain type electron radiation accelerator at an accelerating voltage 150 keV, electrode current 10 mA, and dose 5 Mrad in $N_2$ gas.

| Backcoat layer 3 | Parts by weight |
| --- | --- |
| Zinc oxide, variable particle size | 30 |
| Carbon black, | 25 |
| (A) Acryl-modified vinyl chloride-vinyl acetate-vinyl alcohol copolymer, MW = 30,000 | 40 |
| (B) Acryl-modified polyurethane elastomer, MW = 20,000 | 40 |
| Polyfunctional acrylate, MW = 1,000 | 20 |
| Oleic acid | 4 |
| Stearyl methacrylate | 2 |
| Mixed solvent, 1/1 MIBK/toluene | 250 |

Backcoat layer 3 was prepared in the same manner as described for backcoat layer 2.

| Backcoat layer 4 | Parts by weight |
| --- | --- |
| $CaCO_3$, 80 μm | 50 |
| (A) Acryl-modified vinyl chloride-vinyl acetate-vinyl alcohol copolymer, MW = 30,000 | 30 |
| (B) Acryl-modified polyurethane elastomer, MW = 50,000 | 30 |
| Acryl-modified phenoxy resin, MW = 35,000 | 20 |
| Polyfunctional acrylate, MW = 500 | 20 |
| Stearic acid | 4 |

-continued

| Backcoat layer 4 | Parts by weight |
|---|---|
| Mixed solvent, 1/1 MIBK/toluene | 300 |

Backcoat layer 4 was prepared in the same manner as described for backcoat layer 2.

(3) Formation of Topcoat Layer

| | Parts by weight |
|---|---|
| Topcoat composition 1 | |
| 2,6-di-tert-butyl-p-cresol, | 1.6 |
| Acryl-modified vinyl chloride-vinyl acetate-vinyl alcohol copolymer (having maleic units incorporated therein), MW = 20,000 | 1 |
| MEK (methyl ethyl ketone) | 100 |
| Topcoat composition 2 | |
| Monoglycol salicylate acrylate | 3 |
| Modified epoxy resin (having succinic units incorporated therein), MW = 6,000 | 2 |
| Myristic acid | 0.3 |
| Myristylalcohol methacrylate | 1.0 |
| MEK/toluene 1/1 | 100 |
| Topcoat composition 3 | |
| Dimethylamino methacrylate | 1 |
| Modified phenoxy resin, MW = 30,000 | 0.6 |
| Acryl-modified polyurethane elastomer, MW = 4,000 | 0.6 |
| Fluorine (electrolytic process) | 0.3 |
| MEK/toluene 1/1 | 100 |

Preparation and Nature of Topcoat Layer (1) Topcoat layer 1 was obtained by applying topcoat composition 1 onto the ferromagnetic thin film followed by exposure to radiation at an accelerating voltage of 150 keV and an electrode current of 6 mA to a dose of 3 Mrad in $N_2$ gas. The topcoat layer was 20 Å thick.

(2) Topcoat layer 2 was obtained by applying topcoat composition 2 onto the ferromagnetic thin film followed by exposure to radiation at an accelerating voltage of 150 keV and an electrode current of 6 mA to a dose of 3 Mrad in $N_2$ gas. The topcoat layer was 50 Å thick.

(3) Topcoat layer 3 was obtained by applying topcoat composition 3 onto the ferromagnetic thin film followed by exposure to radiation at an accelerating voltage of 150 keV and an electrode current of 10 mA to a dose of 5 Mrad in $N_2$ gas. The topcoat layer was 40 Å thick.

| Topcoat composition 4 | | Parts by weight |
|---|---|---|
| (a) | Dimethylaminoethyl methacrylate | 1 |
| | Modified epoxy resin, MW = 80,000 | 0.5 |
| | Acryl-modified polyurethane elastomer, MW = 5,000 | 0.5 |
| | MEK/toluene 1/1 | 100 |

Composition (a) was applied onto the ferromagnetic thin film and then exposed to radiation at an accelerating voltage of 150 keV and an electrode current of 10 mA to a dose of 5 Mrad in $N_2$ gas.

| (b) | Stearylmethacrylate | 0.3 |
|---|---|---|
| | Fluorine oil (telomerization process) | 0.2 |
| | MEK | 100 |

Composition (b) was applied onto composition (a) and then exposed to radiation at an accelerating voltage of 150 keV and an electrode current of 4 mA to a dose of 2 Mrad in $N_2$ gas The resulting topcoat layer was 50 Å thick.

Topcoat composition 5

Film segment (a) of topcoat composition 4 on the ferromagnetic thin film adsorbed stearyl alcohol in an atmosphere at $4 \times 10^{-3}$ Torr. The resulting topcoat layer was 30 Å thick.

Topcoat composition 6

Film segment (a) of topcoat composition 4 on the ferromagnetic thin film adsorbed fluoride-modified oil in an atmosphere at $4 \times 10^{-3}$ Torr. The resulting topcoat layer was 20 Å thick.

Topcoat composition 7 (comparison)

Topcoat composition 7 is the same as topcoat composition 1 except that the radiation-curable compound is omitted and the antioxidant is increased by an amount equal to that of the radiation-curable compound omitted.

Topcoat composition 8 (comparison)

Topcoat composition 8 is the same as topcoat composition 3 except that the radiation-curable compound is omitted and the antioxidant is increased by an amount equal to that of the radiation-curable compound omitted.

Magnetic recording media were prepared using these ferromagnetic thin films and topcoat layers as shown in Table 1 along with their properties.

The magnetic head used in examining the media was of the type shown in FIG. 2 and having a gap distance a of 0.25 μm and a track width of 20 μm. The core halves 21, 22 were formed of ferrite, gap-defining edge portions 31, 32 were amorphous layers of Co 0.8/Ni 0.1/Zr 0.1 (atomic ratio percent) formed by sputtering to a thickness of 3 μm, and the gap filler was glass. For the head of this size, the minimum protrusion distribution density $10^5/a^2$ is calculated to be $1.6 \times 10^6$.

A ferrite magnetic head of the same shape and size was also used for comparison purpose.

The measurement of various properties is described below.

Still life

Signals are recorded in tape at 5 MHz and the reproduced output is measured for still life. A continuous operation in still mode in excess of 10 minutes is acceptable.

Friction on magnetic layer side

A tape is partially wound around a cylinder such that the magnetic layer side is in contact with the cylinder. While a load of 20 g is applied to one end of the tape, the cylinder is rotated 90°. A change of tension is determined for friction measurement.

Protrusion observation

Tape surface was observed under a scanning electron microscope (SEM) and a transmissive electron microscope (TEM).

Output

Signals are recorded and reproduced at a frequency of 5 MHz to determine an S/N ratio (relative value). To this end, a commercially available VHS type video tape recorder is modified so as to make possible measurement at 5 MHz.

Head clogging

A tape is moved 50 passes on a commercially available VHS type video tape recorder. It is observed how the head gap is clogged.

Head adhesion

A tape is moved predetermined passes on a commercially available VHS type video tape recorder. Then the head drum is removed and examined on the tape contacting surface under an optical microscope.

Guide adhesion

A tape is moved predetermined passes on a commercially available VHS type video tape recorder. Then the guide pin is removed and examined under an optical microscope for the adhesion of tape material.

Topcoat wear

A tape is moved predetermined passes on a commercially available VHS type video tape recorder. Then the tape is observed under an optical microscope.

TABLE 1

| No. | Ferromagnetic thin film | Top coat | Back coat | Head adhesion | Still life, min. |
|---|---|---|---|---|---|
| 1 | 1 | 1 | 1 | slight | >10 |
| 2 | 1 | 2 | 2 | none | >10 |
| 3 | 1 | 3 | 3 | none | >10 |
| 4 | 1 | 4 | 2 | none | >10 |
| 5 | 1 | 5 | 3 | slight | >10 |
| 6 | 1 | 6 | 4 | none | >10 |
| 7 | 2 | 2 | 1 | none | >10 |
| 8 | 2 | 4 | 3 | slight | >10 |
| 9 | 2 | 6 | 4 | slight | >10 |
| 10* | 3 | 1 | 1 | middle | 1 |
| 11* | 1 | 7 | 1 | middle | >10 |
| 12* | 1 | 8 | 2 | middle | >10 |
| 13* | 2 | 7 | 3 | middle | >10 |
| 14* | 2 | 8 | 4 | middle | >10 |

| No. | Coefficient of friction** on magnetic side | Guide** Adhesion | Head** Clogging | Output** Stability |
|---|---|---|---|---|
| 1 | 0.20 | slight | none | good |
| 2 | 0.20 | none | none | good |
| 3 | 0.19 | none | none | good |
| 4 | 0.20 | slight | none | good |
| 5 | 0.21 | slight | none | good |
| 6 | 0.19 | slight | none | good |
| 7 | 0.20 | none | none | good |
| 8 | 0.20 | slight | none | good |
| 9 | 0.20 | slight | none | good |
| 10* | top coat layer peeled off | | | |
| 11* | 0.25 | middle | severe | poor |
| 12* | 0.26 | middle | severe | poor |
| 13* | 0.25 | middle | severe | poor |
| 14* | 0.27 | middle | severe | poor |

*comparative example
**40° C., 60%, 50 passes

EXAMPLE 2

Certain properties of magnetic recording tapes are shown in relation to the height and density of protrusions on the magnetic layer surface.

Experiments were carried out using signals having a minimum recording wavelength of 0.7 μm. The magnetic heads used were the same amorphous head as used in Example 1 and a ferrite head of the same shape and size.

The topcoat layer used was topcoat layer 4 and the backcoat layer used was backcoat layer 3 both used in Example 1.

The magnetic layer was formed in the same conditions as used for ferromagnetic thin film 1 in Example 1.

TABLE 2

| Sample No. | Protrusion Height, Å | Protrusion Density,/cm² | Reproducing Output, dB | Head clogging | Head |
|---|---|---|---|---|---|
| 21 | 50 | $2 \times 10^8$ | +0.5 | slight | Amorphous |
| 22 | 50 | $5 \times 10^9$ | 0 | slight | Amorphous |
| 23 | 100 | $4 \times 10^8$ | −0.1 | none | Amorphous |
| 24 | 100 | $5 \times 10^9$ | −0.1 | none | Amorphous |
| 25 | 100 | $2 \times 10^{10}$ | −0.3 | none | Amorphous |
| 26 | 200 | $3 \times 10^8$ | −0.3 | none | Amorphous |
| 27 | 200 | $4 \times 10^9$ | −0.4 | none | Amorphous |
| 28 | 200 | $3 \times 10^{10}$ | −0.4 | none | Amorphous |
| 29 | 300 | $2 \times 10^8$ | −0.3 | none | Amorphous |
| 30 | 300 | $3 \times 10^9$ | −0.2 | none | Amorphous |
| 31 | 300 | $3 \times 10^{10}$ | −0.5 | none | Amorphous |
| 32 | — | — | 0 | severe | Amorphous |
| 33 | 1000 | $3 \times 10^8$ | −8.0 | severe | Amorphous |
| 34 | 100 | $1 \times 10^7$ | −0.1 | slight | Amorphous |
| 35 | 100 | $4 \times 10^8$ | −2.0 | middle | Ferrite |
| 36 | 200 | $4 \times 10^9$ | −2.2 | middle | Ferrite |
| 37 | 300 | $2 \times 10^8$ | −2.0 | middle | Ferrite |
| 38 | 1000 | $3 \times 10^8$ | −11 | severe | Ferrite |

All the ferromagnetic thin films in Examples were found by Auger spectroscopy to be covered with an oxide layer of 100 to 200 Å thick on their surface.

Although the foregoing Examples used colloidal silica as the inorganic submicron particles, equivalent results are obtained by using other submicron particles such as alumina sol, titanium black, zirconia, and various hydrosols.

In addition, equivalent results were obtained when a magnetic head formed of an amorphous Co-Fe-Ru-Cr-Si-B alloy was used. Less desirable results were obtained when a Sendust head was used.

What is claimed is:

1. A magnetic recording medium comprising:
    a flexible substrate having opposed major surfaces,
    a ferromagnetic metal thin film layer on one surface of the substrate primarily comprising cobalt,
    an organic topcoat layer on the surface of the metal thin film layer, and
    a backboat layer on the surface of the substrate, the magnetic recording medium being used in combination with a magnetic head having a gap, characterized in that
    said organic topcoat layer contains a radiation-curable compound and an anti-oxidant,
    said backboat layer contains an inorganic pigment, an organic binder, and a lubricant,
    said metal thin film layer contains oxygen, and
    the medium has protrusions on its surface at an average density of at least $10^5/a^2$ per square millimeter of the surface, where a is the distance of the magnetic head gap as expressed in μm and is from 0.1 to 0.4 μm, said protrusions corresponding to the submicron particles of a size of 30 to 300 Å within the medium, said protrusions having a height of 30 to 300 Å.

2. A magnetic recording medium according to claim 1 wherein said organic topcoat layer further contains a lubricant.

3. A magnetic recording medium according to claim 1 wherein said flexible substrate is comprised of a high polymer, and the protrusions conform to submicron particles having a size of 30 to 300 Å which are placed on one surface of the substrate.

4. A magnetic recording medium according to claim 1 wherein said ferromagnetic metal thin film layer at the surface is covered with a ferromagnetic metal oxide coating.

5. A magnetic recording medium according to claim 1 wherein the organic binder in the backcoat layer is a radiation curable resin.

6. A magnetic recording medium according to claim 1 wherein the organic binder in the backcoat layer is a composition comprising
   (A) a plastic compound having at least two radiation-curable unsaturated double bonds and a molecular weight of 5,000 to 100,000,
   (B) a rubber-like compound having at least one radiation-curable unsaturated double bond or not being radiation curable and having a molecular weight of 3,000 to 100,000, and
   (C) a compound having at least one radiation-curable unsaturated double bond and a molecular weight of 200 to 3,000.

7. A magnetic recording medium according to claim 1 wherein the anti-oxidant in the organic topcoat layer is comprised of a radiation curable anti-oxidant.

8. A magnetic recording medium according to claim 2 wherein the lubricant in the organic topcoat is comprised of a radiation curable lubricant.

9. A magnetic recording medium according to claim 1 wherein said organic topcoat layer has a thickness of 10 to 100 Å.

10. A method for conducting recording/reproducing operation on a magnetic recording medium comprising a flexible substrate having opposed major surfaces, a ferromagnetic metal thin film layer on one surface of the substrate principally comprising cobalt, an organic topcoat layer on the surface of the metal thin film layer, and a backcoat layer on the other surface of the substrate, by passing the medium across a magnetic head having a gap, characterized in that
   said organic topcoat layer contains a radiation curable compound an anti-oxidant,
   said backcoat layer contains an inorganic pigment, an organic binder, and a lubricant,
   said metal thin film layer contains oxygen, and
   the medium has in average at least $10^5/a^2$ protrusions per square millimeter of the surface, where a is the distance of the magnetic head gas as expressed in $\mu$m and being from 0.1 to 0.4 $\mu$m, said protrusions corresponding to submicron particles of a size of 30 to 300 Å within the medium, and said protrusions having a height of 30 to 300 Å.

11. A magnetic recording/reproducing method according to claim 10 wherein the organic topcoat layer further contains a lubricant.

12. A magnetic recording/reproducing method accord to claim 10 wherein at least an edge portion of the magnetic head including the gap is formed of a ferromagnetic metal material.

13. A magnetic recording/reproducing method according to claim 10 wherein the ferromagnetic metal material is a magnetic amorphous cobalt base alloy.

* * * * *

UNITED STATES PATENT AND TRADEMARK OFFICE
CERTIFICATE OF CORRECTION

PATENT NO. : 4,835,032

DATED : MAY 30, 1989

INVENTOR(S) : ARIOKA ET AL

It is certified that error appears in the above-identified patent and that said Letters Patent is hereby corrected as shown below:

Column 30, line 8, insert --and-- between "compound" and "an anti-oxidant".

Signed and Sealed this

Third Day of July, 1990

Attest:

HARRY F. MANBECK, JR.

*Attesting Officer*     *Commissioner of Patents and Trademarks*